(12) United States Patent
Zhang et al.

(10) Patent No.: US 12,199,676 B2
(45) Date of Patent: Jan. 14, 2025

(54) METHOD AND APPARATUS FOR SATELLITE LASER BROADBAND DEMODULATION

(71) Applicant: HUNAN MAXWELL ELECTRONIC TECHNOLOGY CO., LTD., Changsha (CN)

(72) Inventors: Chuansheng Zhang, Changsha (CN); Gaomao Gong, Changsha (CN); Haijun Zhao, Changsha (CN); Feng He, Changsha (CN); You Lv, Changsha (CN)

(73) Assignee: HUNAN MAXWELL ELECTRONIC TECHNOLOGY CO., LTD., Changsha (CN)

( * ) Notice: Subject to any disclaimer, the term of this patent is extended or adjusted under 35 U.S.C. 154(b) by 338 days.

(21) Appl. No.: 17/777,780

(22) PCT Filed: Aug. 17, 2020

(86) PCT No.: PCT/CN2020/109464
§ 371 (c)(1),
(2) Date: May 18, 2022

(87) PCT Pub. No.: WO2022/036489
PCT Pub. Date: Feb. 24, 2022

(65) Prior Publication Data
US 2022/0416896 A1 Dec. 29, 2022

(51) Int. Cl.
*H04B 10/00* (2013.01)
*H04B 10/29* (2013.01)

(52) U.S. Cl.
CPC .................. *H04B 10/29* (2013.01)

(58) Field of Classification Search
CPC . H04B 10/118; H04B 10/112; H04B 10/1121; H04B 10/1123; H04B 10/1125; H04B 10/1127; H04B 10/1129; H04B 10/114; H04B 10/1143; H04B 10/1149; H04B 10/29; H04B 10/6164; H04B 10/6165
USPC ....... 398/118, 119, 120, 121, 122, 123, 124, 398/125, 126, 127, 128, 129, 130, 131, 398/135, 136, 204, 207, 208, 209, 33, 38
See application file for complete search history.

(56) References Cited

U.S. PATENT DOCUMENTS 10,003,402 B2 * 6/2018 Boroson ................ H04B 10/40
11,128,373 B1 * 9/2021 Podmore .............. H04B 10/112

* cited by examiner

*Primary Examiner* — Hanh Phan
(74) *Attorney, Agent, or Firm* — Trojan Law Offices

(57) ABSTRACT

A method and an apparatus for satellite laser broadband demodulation are provided. The method includes: setting a residual carrier to a carrier acquisition range of a receiver, pulling the residual carrier to an MHz level by adjusting a frequency of a local oscillator laser, and obtaining a precise carrier frequency according to an accurate frequency acquisition, such that the residual carrier enters a fast acquisition band of a carrier tracking phase-locked loop. After carrier acquisition is achieved, carrier tracking and data recovery processing are performed. According to the present disclosure, signal equalization of an ultra-high bandwidth/ultra-high bit rate can be implemented, and carrier acquisition, tracking, and demodulation are quickly achieved for a modulation signal in a high dynamic range.

12 Claims, 12 Drawing Sheets

METHOD AND APPARATUS FOR SATELLITE LASER BROADBAND DEMODULATION

CROSS REFERENCE TO RELATED APPLICATION

This patent application claims the benefit and priority of International Application No. PCT/CN2020/109464 filed on 17 Aug. 2020, the disclosure of which is incorporated by reference herein in its entirety as part of the present application.

TECHNICAL FIELD

The present disclosure relates to the technical field of satellite laser broadband communication, and more particularly to a method and apparatus for laser coherent demodulation.

BACKGROUND ART

The speed of satellite and frequency characteristics of laser, can produce Doppler frequency as high as ±5 GHz, which exceeds frequency range that a conventional receiver can capture, The receiver generally has relatively small digital frequency compensation range during coherent demodulation, such that it is hard to process such a high Doppler carrier range. This does not meet large-capacity and high-speed requirements of satellite laser communication, and may cause problems such as low carrier acquisition precision and poor communication quality.

SUMMARY

The present disclosure aims to overcome disadvantages of the conventional receiver art and provides a method and apparatus for satellite laser broadband demodulation.

The objectives of the present disclosure are achieved by the following technical solutions.

A method for satellite laser broadband demodulation includes the following steps:
  S21. scanning and capture: first setting a residual carrier to a carrier acquisition range of a receiver;
  S22. frequency locking and pulling: then pulling the residual carrier to an MHz level by adjusting a frequency of a local oscillator laser; and
  S23. obtaining a precise carrier frequency according to an accurate frequency acquisition method, such that the residual carrier enters a fast acquisition band of a carrier tracking phase-locked loop.

Further, before step S21, the method further includes step S1 of signal preprocessing which completes preprocessing of a signal containing a residual Doppler carrier, specifically including direct current removal, in-phase-quadrature (IQ) amplitude equalization, automatic gain control (AGC) gain control, and matched filtering, where the direct current removal removes a direct current component in the signal so as to completely eliminate a carrier component; the IQ amplitude equalization compensates disequilibrium of amplitudes and phases of in-phase (I) and quadrature (Q) channels; the AGC gain control adjusts a signal amplitude to be suitable for processing; and the matched filtering is used for filtering out noise signal.

Further, after step S23, the method further includes step S3 of carrier tracking, specifically including: performing, by a carrier loop, a real-time same-frequency and in-phase tracking on an input carrier, and performing a same-frequency and in-phase tracking on a bit and precisely align a middle position of the bit to perform timing extraction.

Further, in step S3 an early-late gate phase-locked loop is used to track a bit timing ring.

Further, step S4 is executed after step S3, and step S4 includes phase ambiguity processing, differential decoding, frame synchronization, state control, descrambling, and decoding, to realize recovery processing of data after bit synchronization in step S3.

An apparatus for satellite laser broadband demodulation includes a signal preprocessing module, a signal acquisition module, and a signal tracking module, where the signal preprocessing module first performs const current removal, IQ amplitude equalization, AGC gain control, and matched filtering on a signal, and then sends the signal to the signal tracking module, and sends signals before and after matched filtering to the acquisition module for coarse acquisition and fine acquisition of a carrier frequency; acquisition results of the coarse acquisition and the fine acquisition are respectively used for a frequency-locked loop and a phase-locked loop in the signal tracking module; and the signal tracking module performs soft bit decision after completing carrier synchronization and symbol/bit synchronization, and outputs data in a parallel bus mode.

Further, the signal acquisition module includes a carrier coarse acquisition module, where carrier precision of an acquisition result of the carrier coarse acquisition module is less than or equal to 1 MHz, and an output result of the coarse acquisition module is used as a frequency discrimination result of the frequency-locked loop and as an input control of a fine acquisition module.

Further, the signal acquisition module includes a carrier fine acquisition module, and the carrier fine acquisition module is configured to obtain a carrier frequency with higher frequency precision than that of a coarse acquisition result, and output a frequency control word to be used by the phase-locked loop of the tracking module, and an integral in the carrier fine acquisition module is used to reduce a sampling rate, realize a filtering effect, and suppress an out-of-band noise near a carrier frequency band to improve a signal-to-noise ratio.

Further, a carrier loop performs a real-time same-frequency and in-phase tracking on an input carrier, and performs a same-frequency and in-phase tracking on a bit and precisely aligns a middle position of the bit to perform timing extraction.

Further, an early-late gate phase-locked loop is used to track a bit timing ring.

The present disclosure has the following merit:
  (1) According to the present disclosure, signal equalization and carrier acquisition and tracking, demodulation of an ultra-high bandwidth/ultra-high bit rate can be implemented in a high dynamic range. by the present disclosure, first a residual carrier is set to a carrier acquisition range of a receiver (scanning and capture), then the residual carrier is pulled to an MHz level by adjusting a frequency of a local oscillator laser (frequency locking and pulling), and finally a precise carrier frequency is obtained according to an accurate frequency acquisition method, such that the residual carrier enters a fast acquisition band of a carrier tracking phase-locked loop. After the carrier acquisition is achieved, carrier tracking and bit recovery processing are carried out.
  (2) According to the present disclosure, coarse acquisition (frequency pulling, elimination of a frequency shift of a high Doppler carrier) is used to pull the residual carrier to the MHz level, and through a manner of combining the coarse acquisition with accurate frequency acquisition, a precise carrier frequency is obtained according to an accurate frequency acquisition method.

(3) The present disclosure provides the satellite laser broadband demodulation recovery apparatus, and signal equalization of an ultra-high bandwidth/ultra-high bit rate can be implemented, and carrier acquisition and tracking, and information data demodulation and recovery are quickly achieved for a modulation signal in a high frequency dynamic range. In the solution proposed by the present disclosure, first a residual carrier is set to a carrier acquisition range of a receiver (scanning and capture), then the residual carrier is pulled to an MHz level by adjusting a frequency of a local oscillator laser (frequency locking and pulling), and finally a precise carrier frequency is obtained according to an accurate frequency acquisition method, such that the residual carrier enters a fast acquisition band of a carrier tracking phase-locked loop. After carrier acquisition is achieved, carrier tracking and data recovery processing are performed.

BRIEF DESCRIPTION OF THE DRAWINGS

To describe the technical solutions in the embodiments of the present disclosure or in the conventional art more clearly, the accompanying drawings required for describing the embodiments or the conventional art will be described briefly below. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

Figure 1:
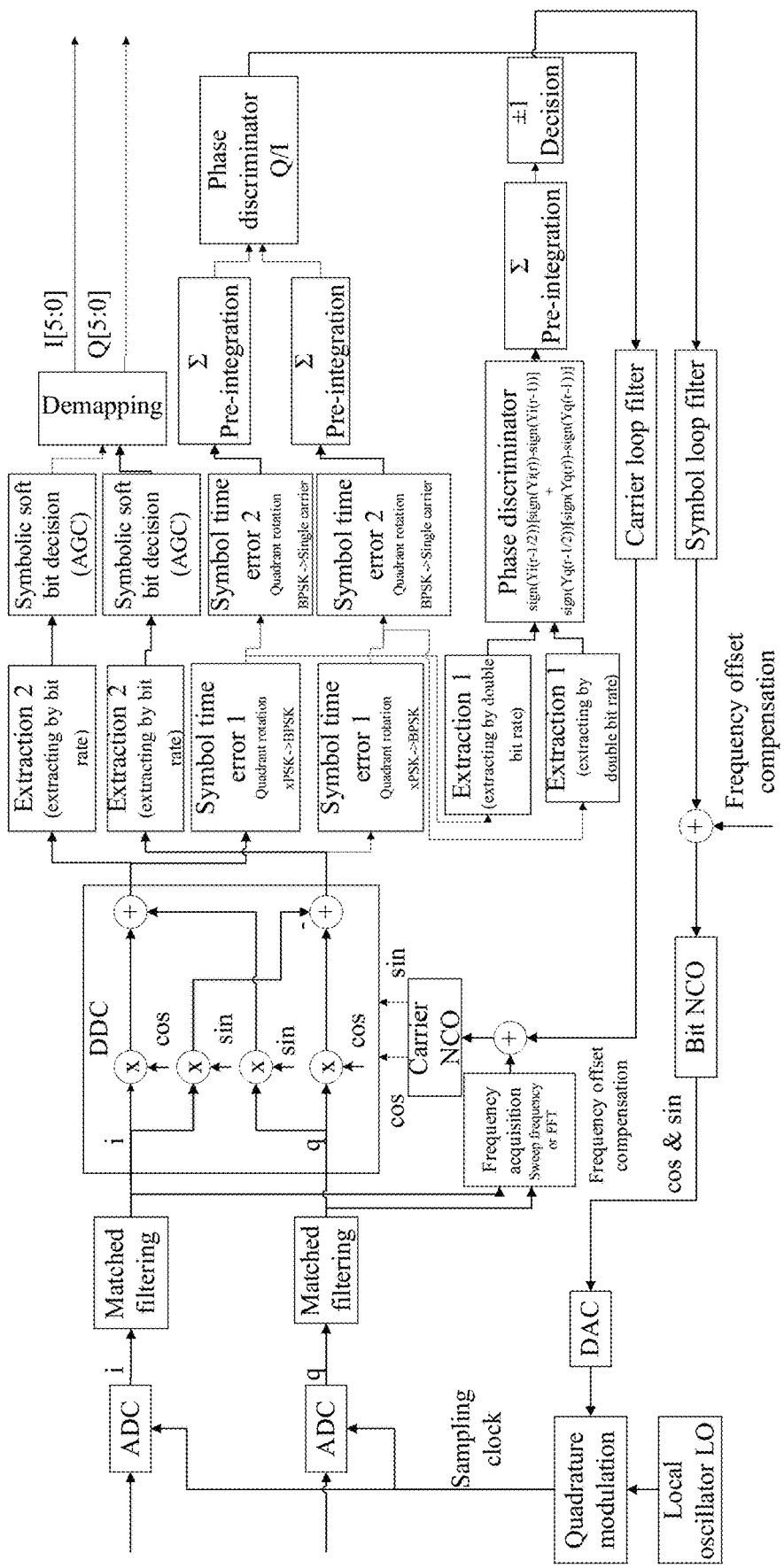
FIG. 1 is a block diagram of a principle structure of a carrier tracking loop of the present disclosure.
Figure 2:
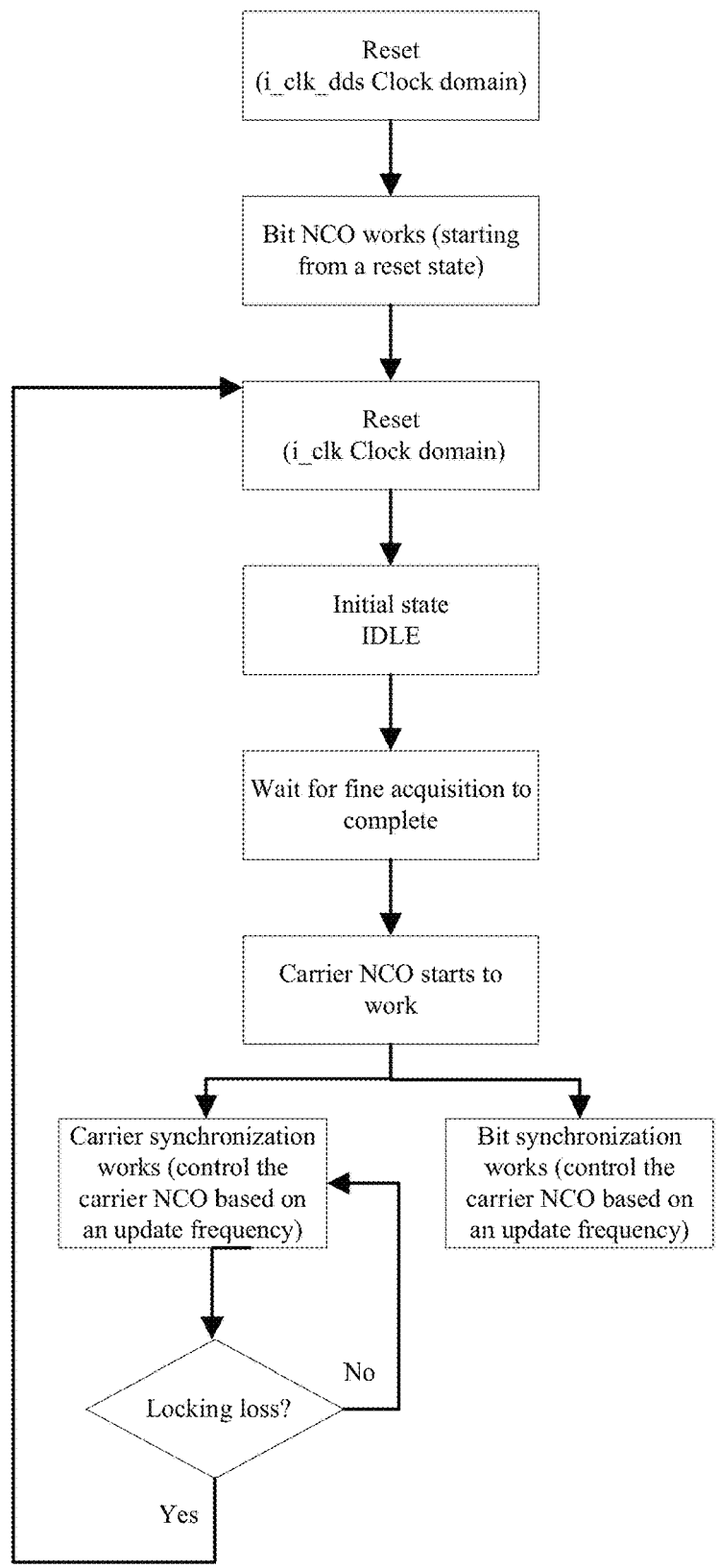
FIG. 2 is a schematic diagram of a running process of a tracking module of the present disclosure.

The technical solutions of the present disclosure are described in further detail below with reference to the corresponding drawings, but the protection scope of the present disclosure is not limited thereto. In this specification, all disclosed features, or implicitly disclosed methods or steps in the processes, except for mutually exclusive features and/or steps, can be combined in any way.

Any feature disclosed in this specification (including any appended claims, abstract, and drawings), unless specifically stated, may be replaced by other alternative features with equivalent or similar purposes. That is, unless specifically stated, each feature is just one example of a series of equivalent or similar features.

Specific embodiments of the present disclosure may be described in detail below. It should be noted that the embodiments described herein are only used for exemplification and are not used to limit the present disclosure. In the following description, numerous specific details are elaborated in order to provide a thorough understanding of the present disclosure. However, it is obvious for a person of ordinary skill in the art that it is not necessary to adopt these specific details to implement the present disclosure. In other examples, in order to avoid confusing the present disclosure, well-known circuits, software, methods, or the like are not described in detail.

The following clearly and completely describes the technical solutions in the embodiments of the present disclosure with reference to accompanying drawings in the embodiments of the present disclosure. Apparently, the described embodiments are merely a part rather than all of the examples of the present disclosure. All other embodiments obtained by a person of ordinary skill in the art based on the embodiments of the present disclosure without creative efforts shall fall within the protection scope of the present disclosure.

Before describing the embodiments, some necessary terms need to be explained. For example:

If terms such as "first" and "second" are used in this application to describe various elements, these elements should not be limited by these terms. These terms are only used to distinguish one element from another. Therefore, a "first" element discussed below may also be referred to as a "second" element without departing from the content of the present disclosure. It should be understood that when an element is referred to as being "connected" or "coupled" to another element, it can be connected or coupled to the other element directly or through an intermediate element. Conversely, when an element is referred to as being "directly connected" or "directly coupled" to another element, there are no intermediate element.

Various terms appearing in this application are only used for the purpose of describing specific embodiments and are not intended to limit the present disclosure, and the singular form is also intended to include the plural form unless otherwise indicated clearly from the context.

When the terms "including" and/or "included" are used in this specification, these terms indicate the existence of the described features, wholes, steps, operations, elements, and/or components, but do not exclude the existence and/or addition of one or more other features, wholes, steps, operations, elements, components, and/or groups thereof.

As shown in FIG. 1 to FIG. 11, a satellite laser broadband demodulation method includes:

S21. scanning and capture: setting a residual carrier to a carrier acquisition range of a receiver;

S22. frequency locking and pulling: pulling the residual carrier to an MHz level by adjusting a frequency of a local oscillator laser; and S23. obtaining a precise carrier frequency according to an accurate frequency acquisition method, such that the residual carrier enters a fast acquisition band of a carrier tracking phase-locked loop.

Further, before step S21, the method further includes step S1 of signal preprocessing, which completes preprocessing of a signal containing a residual Doppler carrier, specifically including direct current removal, in-phase-quadrature (IQ) amplitude equalization, automatic gain control (AGC) gain control, and matched filtering, where the direct current removal aims to remove a direct current component in the signal so as to completely eliminate a carrier component; the IQ amplitude equalization compensates disequilibrium of amplitudes and phases of in-phase (I) and quadrature (Q) channels; the AGC gain control adjusts a signal amplitude to be suitable for processing; and the matched filtering is used for filtering out a noise signal.

Further, after step S23, the method further includes step S3 of carrier tracking, specifically including: performing, by a carrier loop, a real-time same-frequency and in-phase tracking on an input carrier, and performing a same-frequency and in-phase tracking on a bit and precisely aligning a middle position of the bit to perform timing extraction.

Further, in step S3 an early-late gate phase-locked loop is used to track a bit timing ring.

Further, step S4 is executed after step S3, and includes phase ambiguity processing, differential decoding, frame synchronization, state control, descrambling, and decoding, and Step 4 is used to realize recovery processing of data after bit synchronization in step S3.

An apparatus for satellite laser broadband demodulation includes a signal preprocessing module, a signal acquisition module, and a signal tracking module. The signal preprocessing module first performs direct current removal, IQ amplitude equalization, AGC gain control, and matched filtering on a signal, and then sends the signal to the signal tracking module, and meanwhile, sends signals before and after matched filtering to the acquisition module for coarse acquisition and fine acquisition of a carrier frequency. Two acquisition results are respectively used for a frequency-locked loop and a phase-locked loop in the signal tracking module. The signal tracking module performs soft bit decision after completing carrier synchronization and symbol/bit synchronization, and outputs data in a parallel bus mode.

Further, the signal acquisition module includes a carrier coarse acquisition module, where carrier precision of an acquisition result of the carrier coarse acquisition module is less than or equal to 1 MHz, and an output result of the coarse acquisition module has two purposes: one is used as a frequency discrimination result of the frequency-locked loop, and the other is as an input control of a fine acquisition module.

Further, the signal acquisition module includes a carrier fine acquisition module, and the carrier fine acquisition module is configured to obtain a carrier frequency with higher frequency precision than that of a coarse acquisition result, and output a frequency control word to be used by the phase-locked loop of the tracking module. An integral in the carrier fine acquisition module has two purposes: one is to reduce a sampling rate, and the other is to realize a filtering effect, and suppress an out-of-band noise near a carrier frequency band to improve a signal-to-noise ratio.

Further, a carrier loop performs a real-time same-frequency and in-phase tracking on an input carrier, performs a same-frequency and in-phase tracking on a bit and precisely aligns a middle location of the bit to perform timing extraction.

Further, an early-late gate phase-locked loop is used to track a bit timing ring.

A method for satellite laser broadband demodulation includes the following steps:

Step 1: Signal preprocessing: Preprocessing, including direct current removal, IQ amplitude equalization, AGC gain control, and matched filtering, is performed on a signal containing a residual Doppler carrier, where the direct current removal aims to remove a direct current component in a signal so as to completely eliminate a carrier component; the IQ amplitude equalization compensates disequilibrium of amplitudes and phases of in-phase (I) and quadrature (Q) channels; the AGC gain control adjusts a signal amplitude to be suitable for processing; and matched filtering is further used for filtering out a noise signal.

Step 2: Carrier acquisition: The step includes three steps: scanning and capture, frequency locking and pulling, and frequency fine acquisition. This step achieves acquisition of a carrier frequency in a signal, and the acquisition of the carrier frequency includes coarse acquisition and fine acquisition. The coarse acquisition is used to control a frequency-locked loop (to achieve frequency locking and pulling), and needs to acquire carrier frequency within a wide dynamic change range. A carrier frequency result of the fine acquisition (frequency fine acquisition) is used as an initial frequency input of the carrier phase-locked loop.

Step 3: Carrier tracking: After the acquisition is achieved, a carrier frequency is roughly estimated without phase information. In order to completely remove a carrier in a digital intermediate frequency input signal and down-convert the signal from an intermediate frequency to a baseband, it is necessary to make a locally recovered carrier and an input carrier have the same frequency and phase. Therefore, the carrier loop needs to perform a real-time same-frequency and in-phase tracking on the input carrier. In order to recover a bit stream, it is necessary to perform a same-frequency and in-phase tracking on a bit, and precisely align a middle position of the bit to perform timing extraction. According to the present disclosure, an early-late gate (lead-lag) phase-locked loop is used to track a bit timing ring.

Step 4: Signal recovery: The step includes phase ambiguity processing, differential decoding, frame synchronization, state control, descrambling, and decoding, to realize recovery processing of data after bit synchronization.

The present disclosure also provides a satellite laser broadband demodulation recovery apparatus, including three modules: a signal preprocessing module, a signal acquisition module, and a signal tracking module. A working clock frequency is set to 156.25 MHz of a signal accompanying clock (a sampling center frequency of an analog to digital converter (ADC) is set to 5 GHz). A signal is first preprocessed (via direct current removal, IQ amplitude equalization, AGC gain control, and matched filtering), and then sent to the signal tracking module. Then signals before and after matched filtering both are sent to the acquisition module for coarse acquisition and fine acquisition of a carrier frequency. Two acquisition results are respectively used for a frequency-locked loop and a phase-locked loop in the signal tracking module. The signal tracking module performs a soft bit decision after completing carrier synchronization (carrier phase-locked loop) and symbol/bit synchronization (symbol/bit phase-locked loop), and outputs data in a parallel bus mode.

Carrier coarse acquisition: A range of carrier frequency that the module needs to acquire is ±500 MHz (a maximum Doppler may reach ±5 GHz during laser reception, and when a range exceeds ±500 MHz, it is necessary to control a laser local oscillator frequency again. Carrier precision of an acquisition result needs to be less than or equal to 1 MHz. An input of the carrier coarse acquisition is data before digital matched filtering, because if a residual carrier in the data is large, a signal spectrum may exceed a bandwidth of a filter, a signal energy may be partially filtered out, and this may affect an acquisition result.

An output result of the coarse acquisition module has two purposes: one is used as a frequency discrimination result of the frequency-locked loop, and the other is as an input control of a fine acquisition module (an amplitude is used to determine whether the fine acquisition should be started, and a frequency word is used as a pre-compensated carrier frequency of a digital down converter (DDC) of the fine acquisition).

Carrier fine acquisition: A carrier frequency with higher frequency precision than that of the coarse acquisition result is obtained, and a frequency control word is output to be used by the phase-locked loop of the tracking module. A range of carrier frequency that the module needs to acquire is ±20 MHz, and carrier precision of an acquisition result needs to be less than or equal to 200 kHz. An input of the carrier fine acquisition is data obtained after digital matched filtering (that is, the carrier fine acquisition and the tracking module use the same input data).

Integration (segment integration) in the carrier fine acquisition module has two functions: one is to reduce calculation rating, and the other is to suppress an out-of-band noise near a carrier frequency band to improve a signal-to-noise ratio. In the fine acquisition module, integrating is first performed and then fast Fourier transform (FFT) is performed, and even under a maximum Doppler dynamic effect, an acquisition precision is 81.37 kHz.

Carrier tracking loop: The carrier tracking loop mainly implements tracking of a signal carrier and bit timing, symbol decision (soft bit decision), and signal-to-noise ratio estimation.

The tracking loop is an important part of a receiver, and mainly includes: a carrier tracking loop and a symbol timing loop. After the acquisition is achieved, a rough estimate of a carrier frequency is carried out without phase information. In order to remove a carrier in a digital intermediate frequency input signal and down-convert the signal from an intermediate frequency to a baseband, it is necessary to make a locally recovered carrier and an input carrier have the same frequency and phase. Therefore, the carrier loop needs to perform the real-time same-frequency and in-phase tracking on the input carrier. The present disclosure uses a Costas loop to realize carrier tracking. In order to recover a bit stream, it is necessary to perform the same-frequency and in-phase tracking on a bit and precisely align a middle position of the bit to perform timing extraction, and an early-late gate (lead-lag) phase-locked loop is used to track a bit timing ring.

A principle block diagram of a tracking loop of a high bit rate cross-correlated phase-shift keying (xPSK) system is shown in FIG. 1.

A tracking module needs to use two clocks, one is a demodulation data domain clock i_clk, and the other is a working clock i_clk_dds of a bit-synchronized numerically controlled oscillator (NCO). i_clk_dds precedes i_clk, and reset release (i_rst_dds) of i_clk_dds also precedes i_rst.

Therefore, after the i_clk_dds clock's arrival and the i_rst_dds reset release, the bit NCO of the tracking module works first. Then, after the i_clk being valid and the i_rst reset release, other internal logics of the tracking module enter an initial state. After a fine acquisition carrier result is input, carrier synchronization and bit synchronization start working at the same time. The tracking module is equipped with automatic timing detection for the carrier synchronization. Once a carrier synchronization locking loss is detected, all modules except the bit NCO and a locking loss timing detection module are reset automatically, such that the tracking module basically enters a reset initial state, to wait for restarting synchronization of the two loops after a next fine acquisition is achieved.

Figure 3:
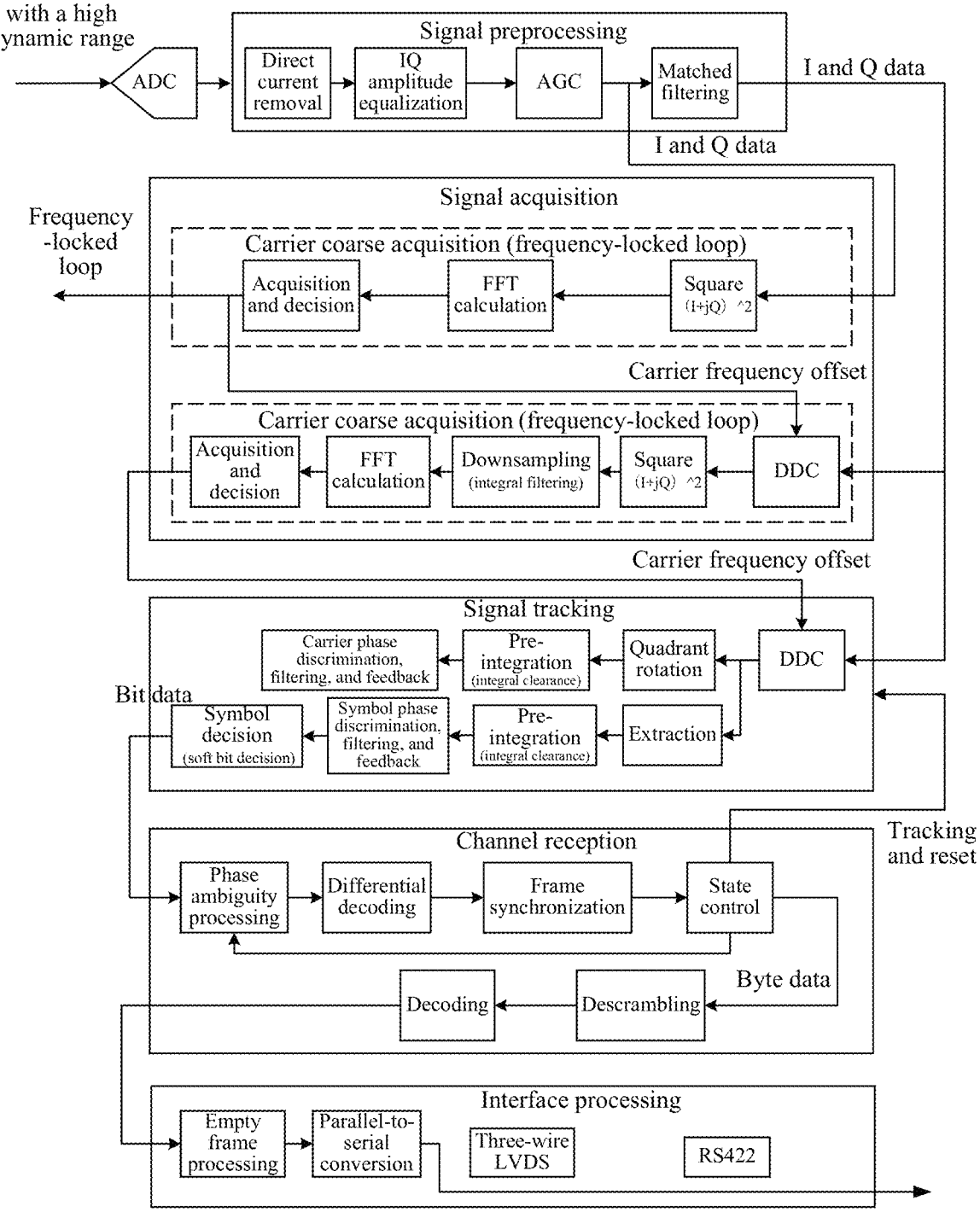
FIG. 3 is a schematic diagram of a signal processing flow of the present disclosure.

Signal processing includes several major parts: signal preprocessing, signal acquisition, signal tracking, data recovery, channel reception, interface processing, etc. A detailed processing process is shown in FIG. 3.

A demodulation module mainly achieves demodulation of a signal and outputs soft bit decision data.

The demodulation module performs carrier extraction, timing extraction, extraction decision, and parallel-to-serial conversion in the above figure. A demodulation process is implemented by both software and hardware, because timing extraction required for symbol synchronization needs to be achieved by adjusting a frequency and a phase of a sampling clock of the ADC.

A digital demodulator may include four main processes according to functions: gain control (AGC), equalization compensation (IQ amplitude compensation and phase compensation), carrier synchronization (including carrier acquisition and carrier tracking), bit synchronization, and symbol decision (constellation diagram mapping).

A demodulator has three main loops: a gain control loop (AGC), a carrier loop (phase-locked loop (PLL)), and a bit synchronization loop (based on a PLL technology). The three loops can work independently and in parallel. Digital AGC is used in digital signal processing. However, for frequency drift characteristics of a transceiver laser in laser communication, a frequency-locked loop needs to be used to control a receiving optical local oscillator. The demodulator module is responsible for frequency discrimination calculation in the frequency-locked loop. A software structure of the demodulation module may include three modules: a signal preprocessing module, a signal acquisition module, and a signal tracking module. A working clock frequency is set to 156.25 MHz of a signal accompanying clock, a sampling frequency of the ADC is dynamically adjusted with 5 GHz as the center. A signal is first preprocessed (via direct current removal, IQ amplitude equalization, AGC gain control, and matched filtering), and then sent to the signal tracking module. Signals before and after matched filtering both are sent to the acquisition module for coarse acquisition and fine acquisition of a carrier frequency. Two acquisition results are respectively used for a frequency-locked loop and a phase-locked loop in the signal tracking module. The signal tracking module performs soft bit decision after completing carrier synchronization (carrier phase-locked loop) and symbol/bit synchronization (symbol/bit phase-locked loop), and outputs data in a parallel bus mode.

Signal acquisition module: due to satellite motion and a frequency characteristic of a laser, a carrier Doppler received by a receiver is as high as ±5 GHz. The range exceeds a frequency range that a conventional receiver can acquire, and a digital frequency compensation range of the receiver is limited during coherent demodulation. Therefore, it is necessary to: first set a residual carrier to the carrier acquisition range of the receiver (scanning and capture), then pull the residual carrier to an MHz level by adjusting a frequency of a local oscillator laser (frequency locking and pulling), and finally obtain a precise carrier frequency by way of an accurate frequency acquisition, such that the residual carrier enters a fast acquisition band of a carrier tracking phase-locked loop. The coarse acquisition (frequency pulling and elimination of a frequency shift of a high Doppler carrier) is used to pull the residual carrier to the MHz level, and the precise carrier frequency is obtained according to the accurate frequency acquisition method.

Figure 4:
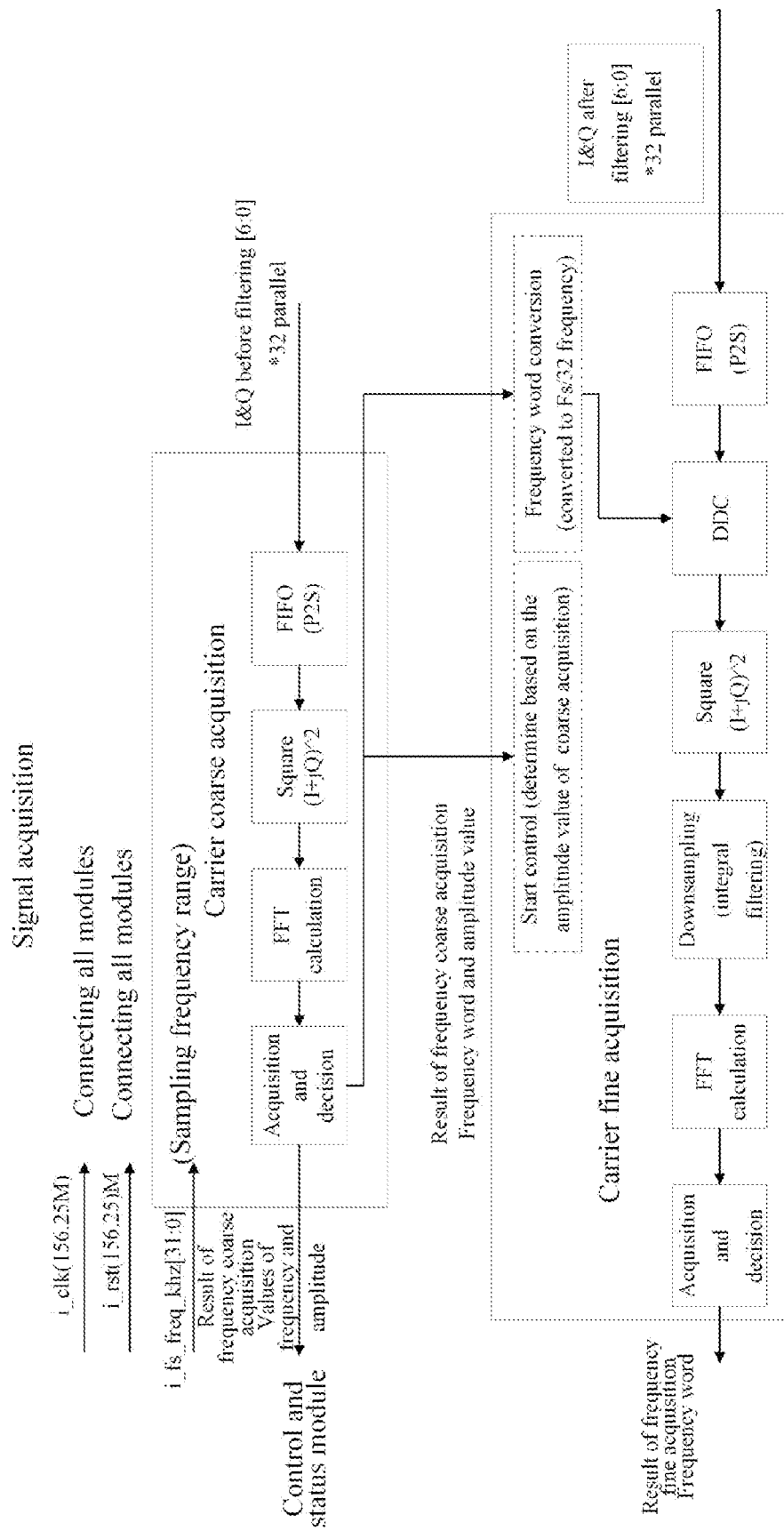
FIG. 4 is a software structure diagram of a module.

FIG. 4 is a software structure diagram of a module.

A realization principle is as follows. A Fourier transform formula is:

$$F(j\omega) = \int_{-\infty}^{+\infty} x_{(t)} * e^{-j\omega t} dt$$

In IQ modulation:

$$x_{(t)} = (I+jQ) * e^{j\omega_{lo} t}$$

Therefore:

$$F(j\omega) = \int_{-\infty}^{+\infty} (I+jQ) * e^{j\omega_{lo} t} * e^{-j\omega t} dt$$

$$F(j\omega) = \int_{-\infty}^{+\infty} (I+jQ) * e^{j(\omega_{lo}-\omega)t} dt$$

Therefore, frequency acquisition may be affected by symbol modulation, so it is necessary to remove an effect of the symbol modulation on a carrier frequency. The following formula is obtained by squaring the left and right sides of the equal sign:

$$R(j\omega) = \int_{-\infty}^{+\infty} (I+jQ)^2 * e^{2j(\omega_{lo}-\omega)t} dt$$

where, $(I+jQ)^2$ is expanded to be $I^2 + (jQ)^2 + 2IjQ$;

For binary phase shift keying (BPSK), Q in this item is 0; for quadrature phase shift keying (QPSK), an integral value of I2 in the above formula is equal to an integral value of Q2, and the two may offset each other, then the above formula becomes:

BPSK: $R(j\omega) = \int_{-\infty}^{+\infty} (I)^2 * e^{2j(\omega_{lo}-\omega)t} dt$ QPSK: $R(j\omega) = \int_{-\infty}^{+\infty} (2IQJ) * e^{2j(\omega_{lo}-\omega)t} dt$ For BPSK, an integral value of $I^2$ is already a constant. For QPSK, the above formula needs to be squared to eliminate an effect of 2IQJ. Therefore, for statistics of a calculation process, both BPSK and QPSK are squared again to obtain the following formulas:

BPSK: $R(j\omega) = \int_{-\infty}^{+\infty} (I)^4 * e^{4j(\omega_{lo}-\omega)t} dt$ QPSK: $R(j\omega) = \int_{-\infty}^{+\infty} (-4I^2 Q^2) * e^{4j(\omega_{lo}-\omega)t} dt$ Except for the term $e^x$ in the above formula, integral values of the remaining terms are a constant value, which may be set to A, then:

$$R(j\omega) = \int A * e^{j4(\omega_{lo}-\omega)t} dt$$

In order to eliminate an effect of a negative sign in QPSK, a modulo value of an integral result of the above formula is obtained.

It can be seen that when $(\omega_{lo} = \omega)$, there is a maximum value. Therefore, carrier acquisition may be achieved.

The acquisition module implements the coarse acquisition of the carrier. A range of carrier frequency that the module needs to acquire is ±500 MHz (a maximum Doppler may reach ±5 GHz during laser reception, and when a range exceeds ±500 MHz, it is necessary to control a laser local oscillator scanning based on coarse acquisition amplitude information, to adjust a received residual carrier to the range of 500 MHz), and carrier precision of an acquisition result needs to be less than or equal to 1 MHz. An input of the carrier coarse acquisition needs to be data before digital matched filtering, because if a residual carrier in the data is large, a signal spectrum may exceed a bandwidth of a filter, a signal energy may be partially filtered out, and this may affect an acquisition result.

An output result of the coarse acquisition module has two purposes: one is used as a frequency discrimination result of the frequency-locked loop, and the other is used as an input control of a fine acquisition module (an amplitude is used to determine whether the fine acquisition should be started, and a frequency word is used as a pre-compensated carrier frequency of a DDC of the fine acquisition).

The coarse acquisition module is used as a frequency discrimination part of the frequency-locked loop. A working diagram of the entire frequency-locked loop is as follows.

Figure 5:
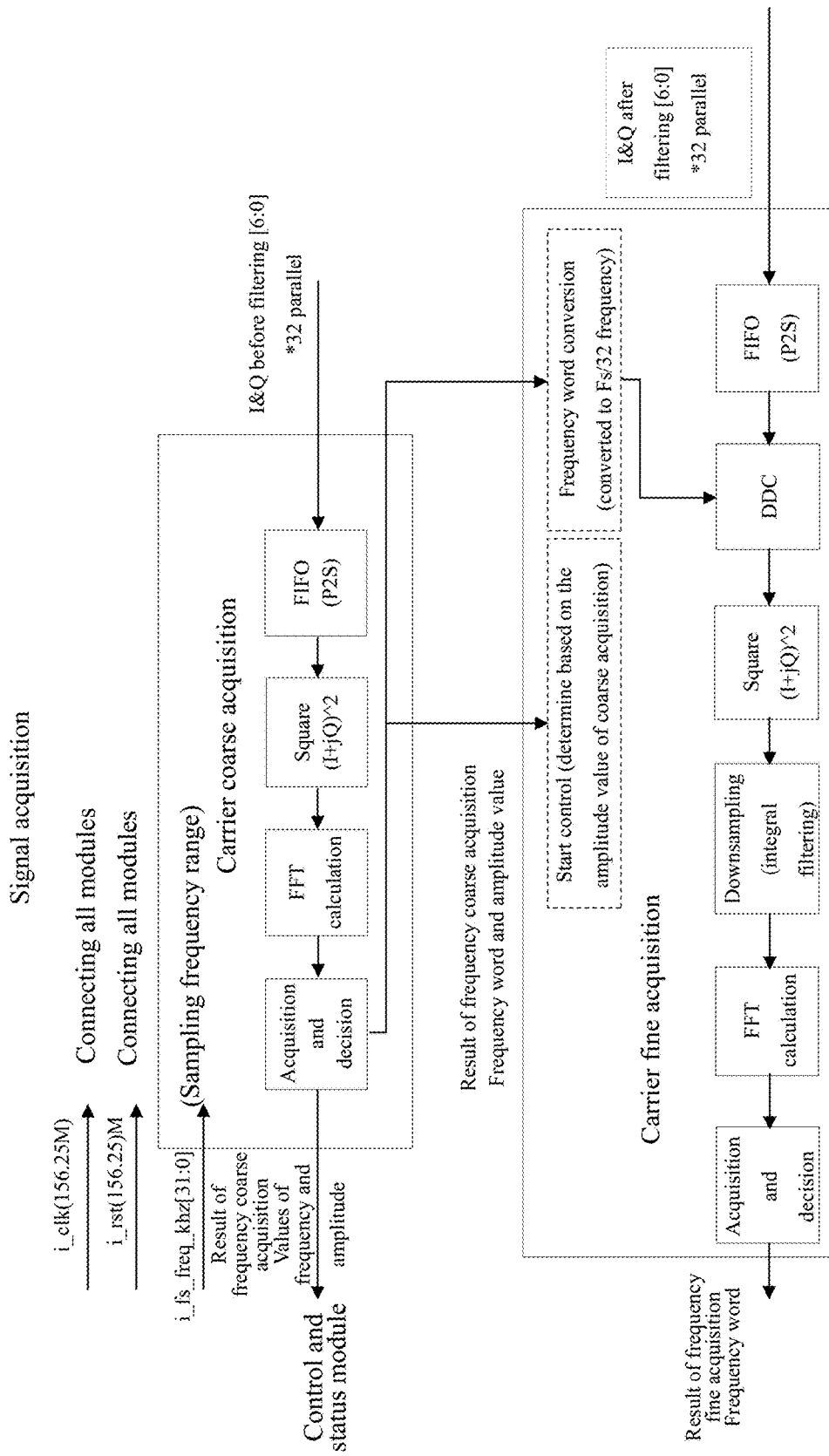
FIG. 5 is a schematic working diagram of a coarse acquisition module.

As regards a processing time delay, a processing time delay (Td) of the acquisition module may include two parts. One is input time T1 (serial input time) of a signal itself. The other is a time delay (T2) of FFT processing. When a carrier frequency changes greatly, the longer data input time may cause an FFT peak to be blurred, and the longer processing time may cause an FFT output frequency not to represent a true frequency value. At present, the number of FFT design points in the coarse acquisition module is 4096, and design parameters determined based on the points are shown in FIG. 5.

Even under a maximum Doppler dynamic effect, an acquisition precision is 611.78 kHz.

Fine acquisition module: The module implements carrier fine acquisition, obtains a carrier frequency with higher frequency precision than that of the coarse acquisition result, and outputs a frequency control signal to be used by the phase-locked loop of the tracking module. A range of carrier frequency that the module needs to acquire is ±20 MHz, and carrier precision of an acquisition result is less than or equal to 200 kHz. An input of the carrier fine acquisition is data obtained after digital matched filtering (that is, the fine acquisition module and the tracking module use the same input data).

Integration (segment integration) in the carrier fine acquisition module has two functions: one is to reduce a sampling rate, and the other is to realize a filtering effect to suppress an out-of-band noise near a carrier frequency band to improve a signal-to-noise ratio. Even under a maximum Doppler dynamic effect, an acquisition precision is 81.37 kHz.

Simulation

According to a selected integration and FFT parameters, codes are created for data simulation. Two types of simulation data are used: one is an ideal BPSK signal without a phase noise and Doppler generated for simulation, and the other is actually measured data. The following is a simulation result.

From the above, it can be seen that a final acquired carrier frequency is −499.115 MHz. This is only 8 kHz away from a predetermined value.

Figure 6:
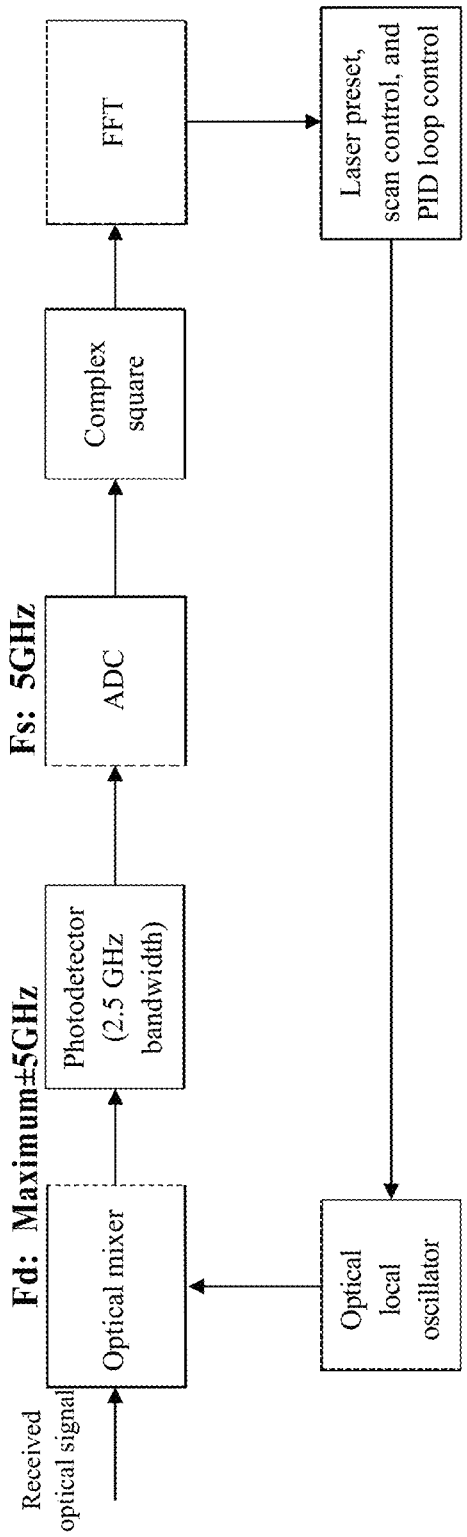
FIG. 6 is a simulation diagram of a signal status.
Figure 7:
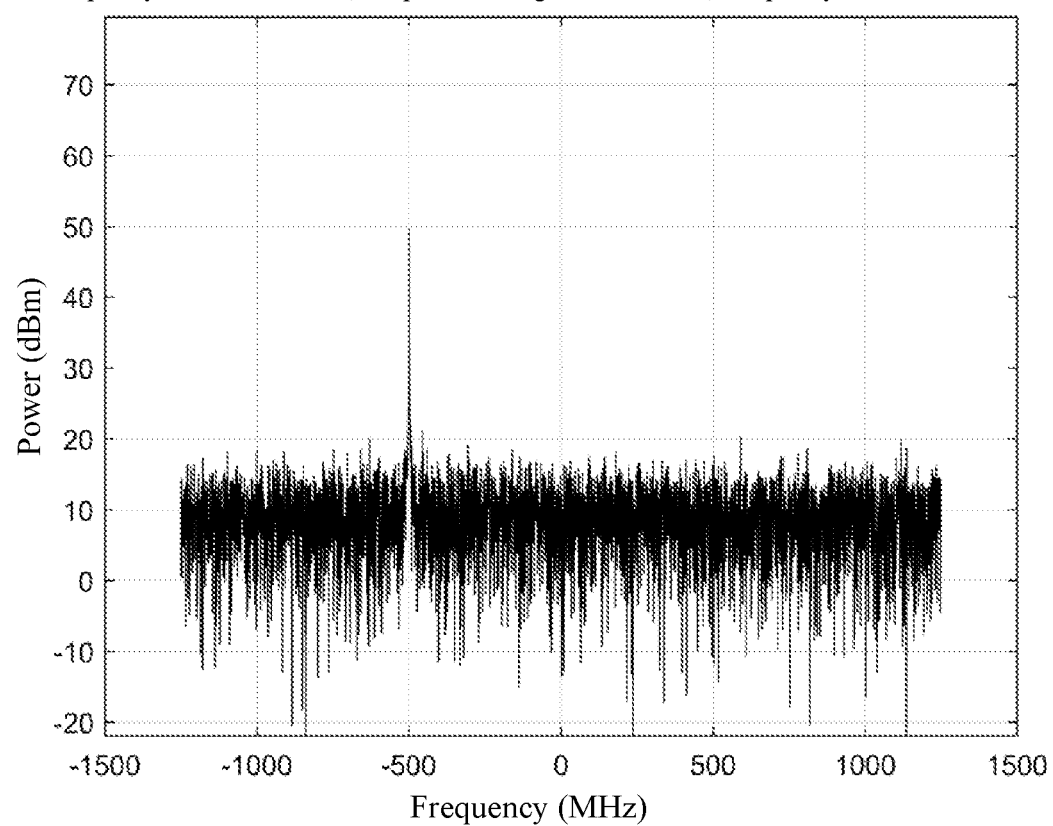
FIG. 7 is a simulation diagram of a coarse acquisition result (an ordinate does not represent an absolute value)
Figure 8:
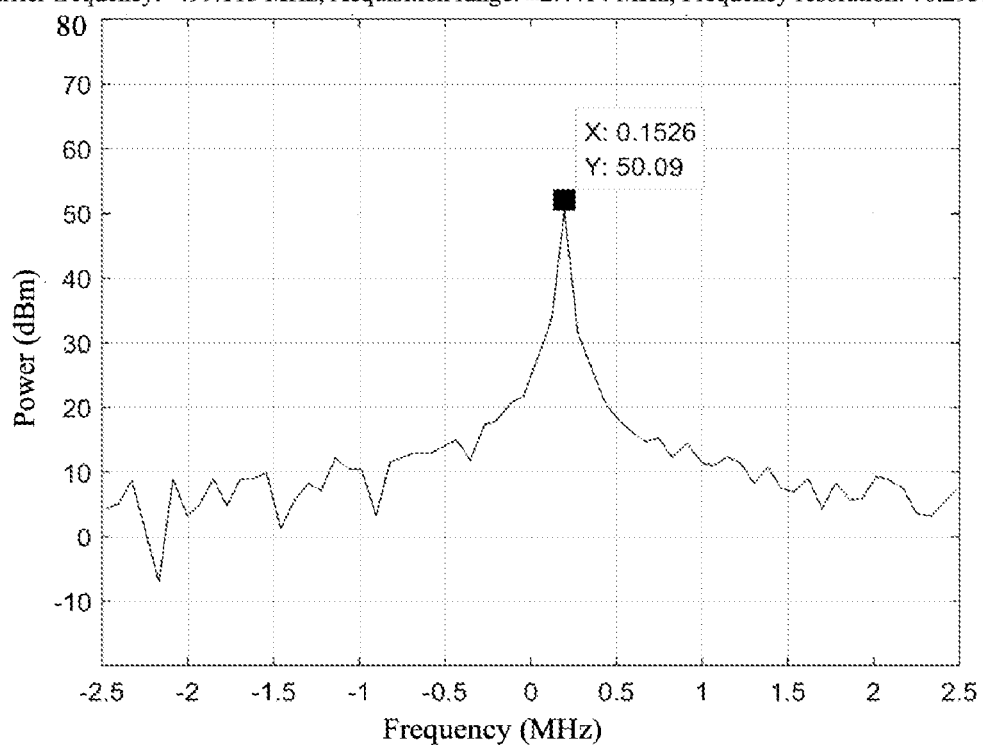
FIG. 8 is a simulation diagram of a fine acquisition result (an ordinate does not represent an absolute value)

(1) When the generated BPSK signal has no phase noise and Doppler, and has a signal-to-noise ratio of 10 dB, and a carrier is set to −499.123 MHz, simulation diagrams are as follows:

FIG. 6 is a simulation diagram of a signal status;

FIG. 7 is a simulation diagram of a coarse acquisition result (an ordinate does not represent an absolute value); and FIG. 8 is a simulation diagram of a fine acquisition result (an ordinate does not represent an absolute value).

From the above, it can be seen that a final acquired carrier frequency is −499.115 MHz. This is only 8 kHz away from a predetermined value.

Figure 9:
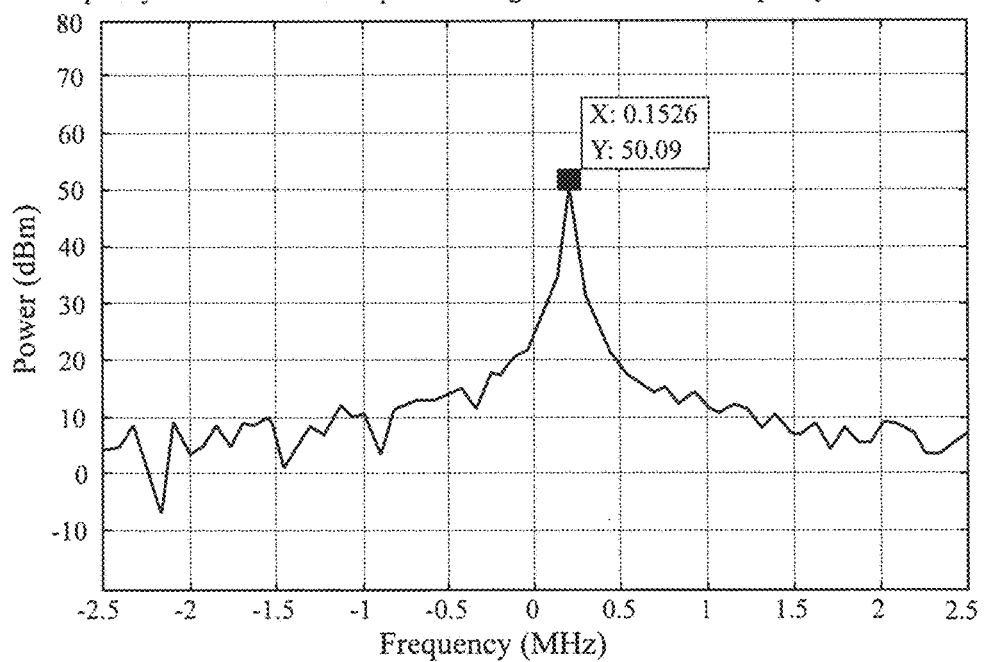
FIG. 9 is a simulation diagram of a signal status.
Figure 10:
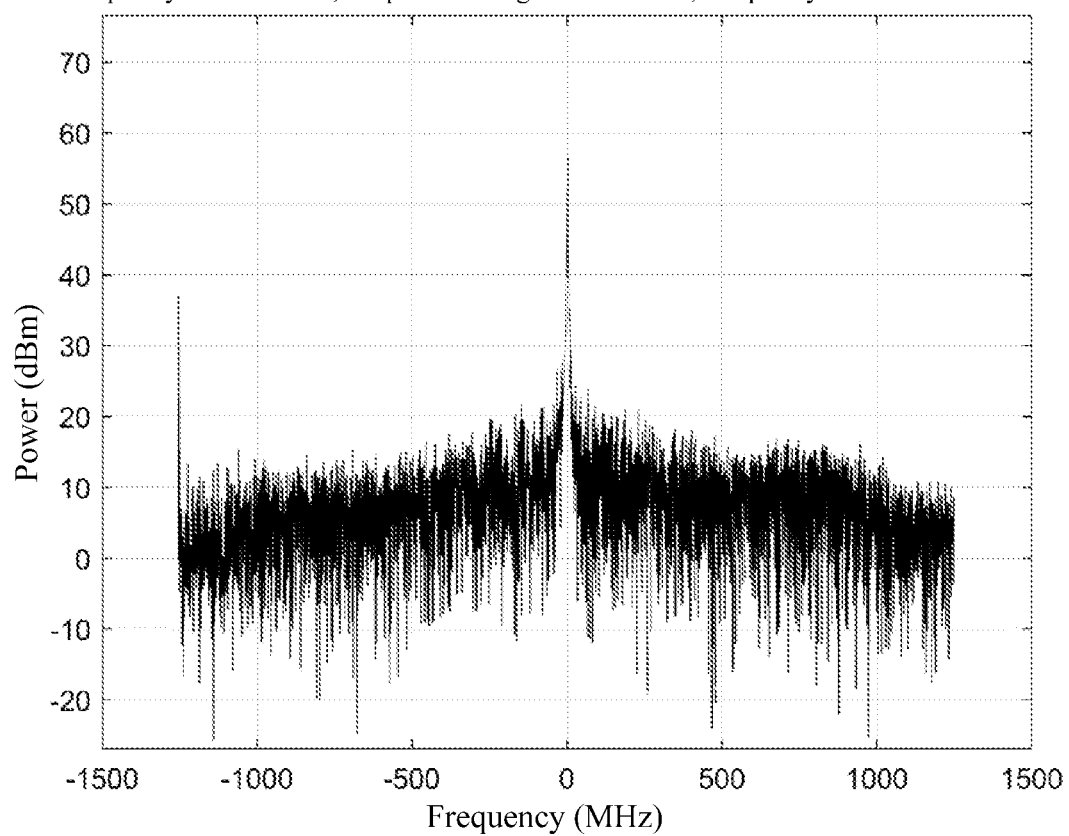
FIG. 10 is a simulation diagram of a coarse acquisition result (an ordinate does not represent an absolute value)
Figure 11:
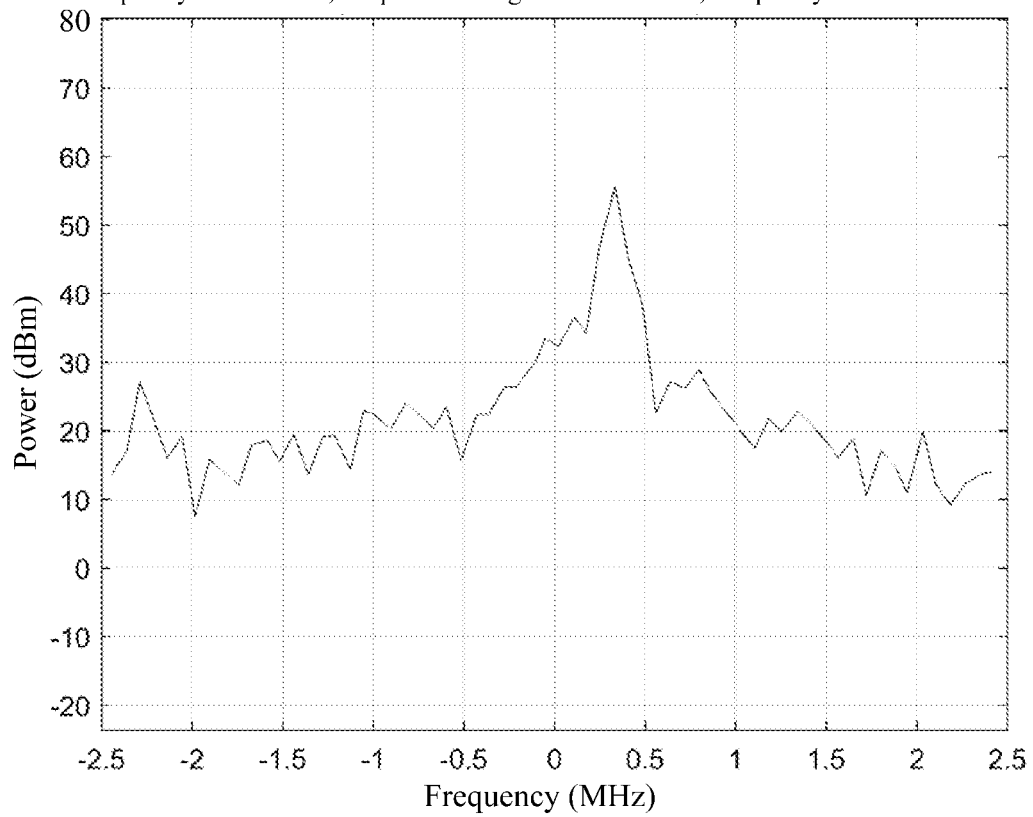
FIG. 11 is a simulation diagram of a fine acquisition result (an ordinate does not represent an absolute value).
Figure 12:
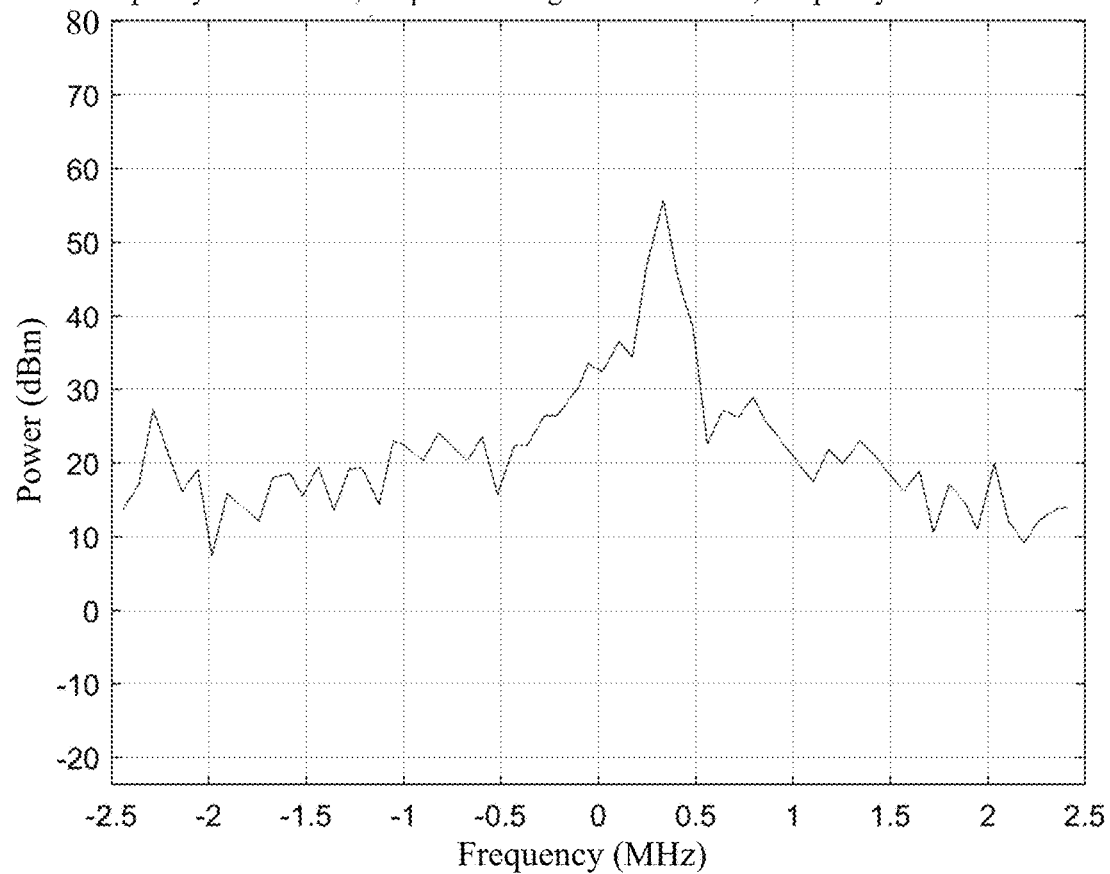

(2) When off-line data during laser communication is a single carrier with a medium phase noise and a signal-to-noise ratio of 15 dB or more, simulation diagrams are as follows:

FIG. 9 is a simulation diagram of a signal status;

FIG. 10 is a simulation diagram of a coarse acquisition result (an ordinate does not represent an absolute value); and FIG. 11 is a simulation diagram of a fine acquisition result (an ordinate does not represent an absolute value).

Signal tracking module: The signal tracking module mainly implements tracking of a signal carrier and a bit timing, symbol decision (soft bit decision), and signal-to-noise ratio estimation.

The tracking loop is an important part of a receiver, and mainly includes: a carrier tracking loop and a symbol timing loop. After the acquisition is achieved, a rough estimate of a carrier frequency is carried out without phase information. In order to completely remove a carrier in a digital intermediate frequency input signal and down-convert the signal from an intermediate frequency to a baseband, it is necessary to make a locally recovered carrier and an input carrier have the same frequency and phase. Therefore, the carrier loop needs to perform the real-time same-frequency and in-phase tracking on the input carrier. The present disclosure adopts a Costas loop to realize carrier tracking. In order to recover a bit stream, it is necessary to perform a same-frequency and in-phase tracking on a bit and precisely align a middle position of the bit to perform timing extraction. According to this solution, an early-late gate (lead-lag) phase-locked loop is used to track a bit timing ring. A principle block diagram of a tracking loop of a high bit rate xPSK system is shown in FIG. 1.

Pre-integration in a carrier-synchronized phase-locked loop: During implementation of a field programmable gate array (FPGA), due to a constraint of a calculation time delay, a quantity of integration points is $2^n$ power. The FPGA performs an average operation on integrated data.

Phase discriminators used in the two loops are as follows:

| Loop type | Phase discriminator | Remarks |
| --- | --- | --- |
| Carrier synchronization: Costas phase-locked loop | $Q_P(n)/I_P(n)$ | Two-phase discriminators for inverse tangent approximate estimation |
| Bit synchronization: symbol delay phase-locked loop | Error(r) = sign($Y_I$ (r − ½)) [sign($Y_I$(r))-sign ($Y_I$(r − 1))] + sign($Y_Q$ (r − ½)) [sign($Y_Q$(r))-sign ($Y_Q$(r − 1))] | Lead-lag phase discrimination |

Meanings of the notations in the above table are as follows:

(1) $I_P(n)$ and $Q_P(n)$ are cumulative sums of instantaneous branches of an I channel and a Q channel at a current time (values obtained after the pre-integration);

(2) sign represents a symbol bit of a sampling point (1 for a positive number and 0 for a negative number); and (3) $Y_I(r)$ and $Y_Q(r)$ represent sampling point values of I and Q channels of an $r^{th}$ symbol at a decision time, and $Y_I(r-½)$ and $Y_Q(r-½)$ represent values of an intermediate sampling point between an $r^{th}$ symbol and an $(r-1)^{th}$ symbol.

Description on phase discrimination of a bit synchronization loop: from the phase discrimination formula, it can be seen that if a polarity of an $r^{th}$ sampling point is opposite to that of an $(r-1)^{th}$ sampling point, an $(r-½)^{th}$ sample point should be zero or is a positive and negative number near zero; or if polarities of the $r^{th}$ and $(r-1)^{th}$ sampling points are the same, sign(YI(r))−sign(YI(r−1))=0. If a bit is synchronized, an error signal of a sampling point: error (r) is 0. If it is leading, an error of a sampling point is negative, of if it is lagging, an error of a sampling point is positive.

Loop filter: Both loop filters of the two loops are ideal first-order active proportional-integral filters (forming a second-order loop). Determination of loop parameters (T, K1, and K2) mainly includes: first determining a loop bandwidth $B_L$, then obtaining integration time T and $\omega_n$, and finally obtaining K1 and K2 by calculation according to the formula.

The loop parameters are determined mainly based on dynamic indicators of a signal to be tracked by the loop (an input signal phase noise, a required fast acquisition bandwidth, a maximum acquisition scan rate, and a maximum synchronization scan rate) and output indicators of the phase-locked loop (a loop signal-to-noise ratio, a fast acquisition time, and a steady state phase difference during frequency ramping up).

Limitation of a processing time delay on integration time. During an FPGA digital implementation of the phase-locked loop, there is a time delay in loop processing. Once a processing time delay approaches or reaches or exceeds the integration time, performance of the loop may be destroyed, and even it will cause loop oscillation which may not be locked. Therefore, during implementation of an FPGA loop with high loop bandwidth, the processing time delay limits improvement of the loop bandwidth. First, the minimum integration time that may be provided is calculated according to the processing time delay. Then, an integration time and loop bandwidth are selected in a compromise based on a relationship between the loop bandwidth and the integration time and an action facilitating digital implementation of an average value after integration.

Analysis of limitation of time delay to integration implementation/loop bandwidth in the present disclosure:

Carrier Synchronization Phase-Locked Loop

The phase-locked loop is fully digitalized inside the FPGA, so a time delay of the loop comes from a data calculation time delay of the FPGA. Loop calculation of the FPGA requires eight clock cycles. An accompanying clock output by the ADC is divided and is used as a main working clock of the phase-locked loop. A frequency of the clock is 156.25 MHz (a cycle is 6.4 ns), so the loop time delay is 51.2 ns. Based on a constraint relationship between the processing time delay and the integration time, the integration time must not be lower than this value.

Bit Synchronization Phase-Locked Loop

An NCO output of the phase-locked loop directly controls the sampling clock of the ADC, so the loop time delay may mainly include two parts: FPGA loop calculation and a propagation time delay of a digital-to-analog converter (DAC) of the NCO.

First, an integration time of the loop is estimated: a dynamic range of a bit Doppler during bit synchronization phase tracking is relatively small (about 1 kHz/s), and a static Doppler has pre-compensation, so the loop bandwidth may be as low as kHz level, and a pre-integration time may reach about 20 us.

The calculation time delay of the FPGA loop is 20 clock cycles, and a propagation time delay of the DAC is 4 clock cycles+21.5 ns. Therefore, when the loop clock is 156.25 MHz (a cycle is 6.4 ns) and a conversion rate of the DAC is 50 MHz (20 ns), a total loop time delay is 229.5 ns. This time delay is relatively small compared with the pre-integration time 20 us, so an effect of the loop time delay on loop performance may be ignored.

(3) In laser communication, a phase noise of an optical carrier restricts a loop bandwidth of carrier synchronization. During the laser communication, phase noises of a receiving laser and a transmitting laser themselves are main factors for determining parameter selection of the phase-locked loop. If the number of integration points is determined to be 16 (an integration time is 102.40 ns), and a corresponding update frequency is 9.77 MHz, a loop bandwidth of 244.14 kHz is obtained.

(4) Pre-compensation precision of a code/bit Doppler in laser communication restricts a bandwidth of a bit synchronization loop. According to the present disclosure, a bandwidth of the code Doppler may reach ±50 kHz and a rate of the code Doppler is 1 kHz/s under the satellite motion. Compared with acceleration 1 kHz/s$^2$ of the code Doppler, the bandwidth of the code Doppler has a smaller restriction on the loop bandwidth. Precision obtained after Doppler pre-compensation is fast acquisition bandwidth that the bit synchronization loop needs to provide, and bit synchronization bandwidth obtained after a comprehensive selection is 1 kHz.

Signal-to-Noise Ratio Estimation Module

Signal-to-noise ratio estimation rotates two-channel data including Idata and Qdata, output by a symbol/bit loop before soft bit decision to be BPSK constellation and performs the following calculation. For parallel data, only one of two channels needs to be selected. Signal-to-noise ratio can be estimated as follows:

$$snr = \frac{I^2 - Q^2}{2Q^2}$$

During FPGA implementation, $I^2+Q^2$ and $2Q^2$ are first calculated for each data point, then mean values of the data, i.e., mean $(I^2+Q^2)$ and mean $(2Q^2)$, are calculated to obtain mean $(I^2+Q^2)*16$, and finally a division is calculated. After taking an integer quotient, a value of a signal-to-noise ratio magnified by 16 times is obtained.

Bit-Synchronized NCO

A frequency output by the bit-synchronized NCO (DDS) is a part of the ADC sampling clock. The ADC sampling clock is a working clock of the entire demodulator.

Tracking Module Operation Process

The tracking module internally runs as follows:

The tracking module needs to use two clocks, one is a demodulation data domain clock i_clk, and the other is a working clock i_clk_dds of the bit-synchronized NCO (DDS). i_clk_dds precedes i_clk, and reset release (i_rst_dds) of i_clk_dds also precedes i_rst.

Therefore, after the i_clk_dds clock's arrival and the i_rst_dds reset release, the bit NCO of the tracking module works first. Then, after the i_clk being valid and the i_rst reset release, other internal logics of the tracking module enter an initial state. After a fine acquisition carrier result is input, carrier synchronization and bit synchronization start working at the same time. The tracking module is equipped with automatic timing detection for the carrier synchronization. Once a carrier synchronization locking loss is detected, all modules except the bit NCO and a locking loss timing detection module are reset automatically, such that the tracking module basically enters a reset initial state (except that an initial phase of the bit NCO may not be recovered, and the initial phase does not affect a bit tracking process), to wait for restarting synchronization of the carrier ring and the bit timing ring after a next fine acquisition is achieved.

As for the remaining technical features in this embodiment, those skilled in the art can flexibly select them according to actual conditions to meet different specific actual requirements. However, it is obvious for those of ordinary skill in the art that it is not necessary to adopt these specific details to implement the present disclosure. In other examples, in order to avoid confusing the present disclosure, well-known algorithms, methods, systems, or the like are not described in detail, which are all within the technical protection scope defined by the technical solutions claimed in the claims of the present disclosure.

For the sake of simplicity, the foregoing embodiments of the method are described as a series of action combinations, but those skilled in the art will recognize that this application is not limited by the sequence of actions described, some steps may be carried out in another order or at the same time according to this application. Secondly, it should be understood by those skilled in the art that the embodiments described in the specification are preferred embodiments and the involved actions and units are not necessarily required for this application.

Those skilled in the art may be aware that units and algorithm steps in examples described with reference to the embodiments disclosed herein can be implemented as electronic hardware or a combination of computer software and electronic hardware. Whether these functions are implemented in hardware or software depends on specific applications of the technical solutions and design constraints. A person skilled in the art may use different methods to implement the described functions for each particular application, but the implementation should not go beyond the scope of the present disclosure.

The disclosed system, module, and method may be implemented in other manners. For example, the described apparatus embodiment is merely an example. For example, the unit division may be merely logical function division and may be other division in actual implementation. For example, a plurality of units or components may be combined or integrated into another system, or some features may be ignored or not performed. In other respects, the intercoupling or direct coupling or communication connection shown or discussed may be indirect coupling or communication connection through some interfaces, apparatuses, or units; or may be implemented in electrical, mechanical, or other manners.

The units described as separate parts may or may not be physically separate. Parts displayed as units may or may not be physical units, which may be located in one position, or may be distributed on a plurality of network units. Some or all of the units may be selected according to actual requirements to achieve the objectives of the solutions of the embodiments.

The functions, if implemented in the form of a software functional unit and sold or used as a stand-alone product, may be stored in a computer-readable storage medium. Based on such understanding, the technical solution of the present disclosure which is essential or a part contributing to the conventional art or a part of the technical solution may be embodied in the form of a software product. The computer software product is stored in a storage medium and includes a plurality of instructions for enabling a computer device (which may be a personal computer (PC), a server, or a network device) to execute all or some steps of the method according to each embodiment of the present disclosure. The storage medium includes: a USB flash disk, a mobile hard disk, a read-only memory (ROM), a random access memory (RAM), a magnetic disk, an optical disk, or other media capable of storing program codes.

Those of ordinary skill in the art can understand that all or some of processes for implementing the methods of the foregoing embodiments can be implemented by instructing relevant hardware through a computer program. The program may be stored in a computer readable storage medium. When the program is executed, processes of the embodiments of the foregoing methods may be included. The storage medium may be a magnetic disk, an optical disk, a ROM, a RAM, or the like.

The above descriptions are merely preferred implementations of the present disclosure, and should not be construed as excluding other embodiments. It should be understood that the present disclosure is not limited to the form disclosed herein, and can be used in various other combinations, modifications and environments. Modifications can be made within the scope of the concept described herein through the above teachings or techniques or knowledge in related fields. Modifications and changes made by those skilled in the art without departing from the spirit and scope of the present disclosure should fall within the protection scope of the appended claims of the present disclosure.

What is claimed is:

1. A method for satellite laser broadband demodulation, comprising:
   S21. scanning and capture: setting a residual carrier to a carrier acquisition range of a receiver;
      wherein before step S21, the method further comprises step S1 of signal preprocessing, which completes preprocessing of a signal containing a residual Doppler carrier, including direct current removal, in-phase-quadrature (IQ) amplitude equalization, automatic gain control (AGC) gain control, and matched filtering, wherein the direct current removal removes a direct current component in the signal so as to completely eliminate a carrier component; the IQ amplitude equalization compensates disequilibrium of amplitudes and phases of in-phase (I) and quadrature (Q) channels; the AGC gain control adjusts a signal amplitude to be suitable for processing; and the matched filtering filters out a noise signal;
   S22. frequency locking and pulling: pulling the residual carrier to an MHz level by adjusting a frequency of a local oscillator laser; and
   S23. obtaining a precise carrier frequency according to an accurate frequency acquisition method, such that the residual carrier enters a fast acquisition band of a carrier tracking phase-locked loop.

2. The method for the satellite laser broadband demodulation according to claim 1, wherein after step S23, the method further comprises step S3 of carrier tracking, comprising: performing, by a carrier loop, a real-time same-frequency and in-phase tracking on an input carrier, and performing a same-frequency and in-phase tracking on a bit and precisely aligning a middle position of the bit to perform timing extraction.

3. The method for the satellite laser broadband demodulation according to claim 2, wherein in step S3, an early-late gate phase-locked loop is used to track a bit timing ring.

4. The method for the satellite laser broadband demodulation according to claim 3, wherein step S4 is executed after step S3, wherein step S4 comprises phase ambiguity processing, differential decoding, frame synchronization, state control, descrambling, and decoding, to realize recovery processing of data after bit synchronization in step S3.

5. The method for the satellite laser broadband demodulation according to claim 1, wherein after step S23, the method further comprises step S3 of carrier tracking, comprising: performing, by a carrier loop, a real-time same-frequency and in-phase tracking on an input carrier, and performing a same-frequency and in-phase tracking on a bit and precisely aligning a middle position of the bit to perform timing extraction.

6. The method for the satellite laser broadband demodulation according to claim 5, wherein in step S3, an early-late gate phase-locked loop is used to track a bit ring.

7. The method for the satellite laser broadband demodulation according to claim 6, wherein step S4 is executed after step S3, wherein step S4 comprises phase ambiguity processing, differential decoding, frame synchronization, state control, descrambling, and decoding, to realize recovery processing of data after bit synchronization in step S3.

8. An apparatus for satellite laser broadband demodulation, comprising a signal preprocessing module, a signal acquisition module, and a signal tracking module, wherein the signal preprocessing module first performs direct current removal, IQ amplitude equalization, AGC gain control, and matched filtering on a signal, and then sends the signal to the signal tracking module, and sends signals before and after matched filtering to the acquisition module for coarse acquisition and fine acquisition of a carrier frequency; acquisition results of the coarse acquisition and the fine acquisition are respectively used for a frequency-locked loop and a phase-locked loop in the signal tracking module; and the signal tracking module performs soft bit decision after completing carrier synchronization and symbol/bit synchronization, and outputs data in a parallel bus mode.

9. The apparatus for the satellite laser broadband demodulation according to claim 8, wherein the signal acquisition module comprises a carrier coarse acquisition module, wherein carrier precision of an acquisition result of the carrier coarse acquisition module is less than or equal to 1 MHz, and an output result of the coarse acquisition module is used as a frequency discrimination result of the frequency-locked loop and as an input control of a fine acquisition module.

10. The apparatus for the satellite laser broadband demodulation according to claim 8, wherein the signal acquisition module comprises a carrier fine acquisition module, wherein the carrier fine acquisition module is configured to obtain a carrier frequency with higher frequency precision than that of a coarse acquisition result, and output a frequency control word to be used by the phase-locked loop of the tracking module, and an integral in the carrier fine acquisition module is used to reduce a sampling rate, realize a filtering effect, and suppress an out-of-band noise near a carrier frequency band to improve a signal-to-noise ratio.

11. The apparatus for the satellite laser broadband demodulation according to claim 8, wherein a carrier loop performs a real-time same-frequency and in-phase tracking on an input carrier, and performs a same-frequency and in-phase tracking on a bit and precisely aligns a middle position of the bit to perform timing extraction.

12. The apparatus for the satellite laser broadband demodulation according to claim 11, wherein an early-late gate phase-locked loop is used to track a bit timing ring.

* * * * *